Oct. 22, 1946.  E. C. CHRISTENSEN  2,409,662
TOWING POLE
Filed Aug. 9, 1944
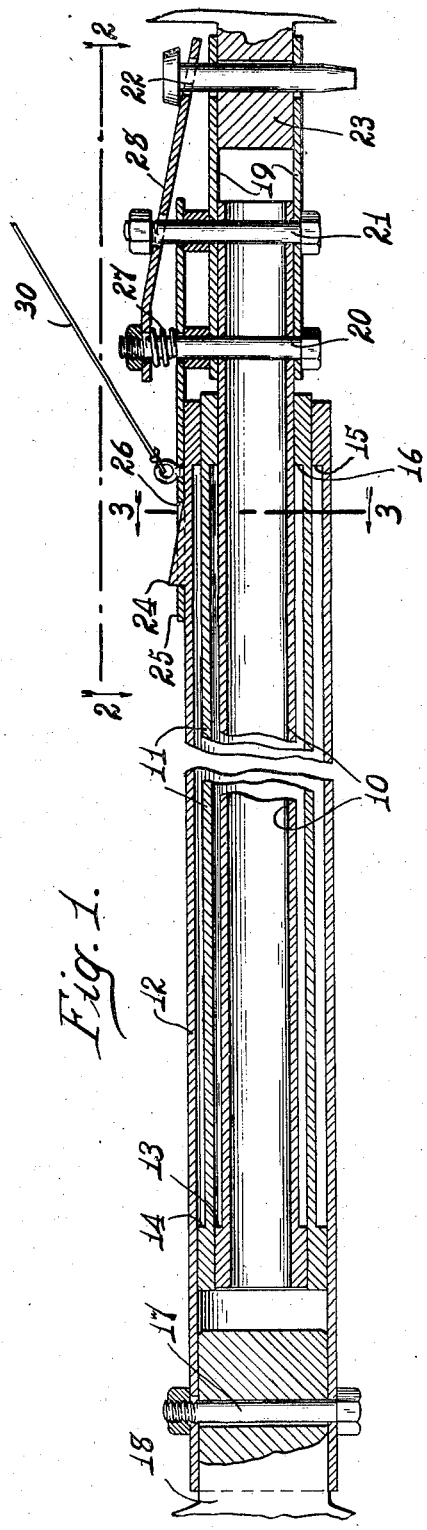
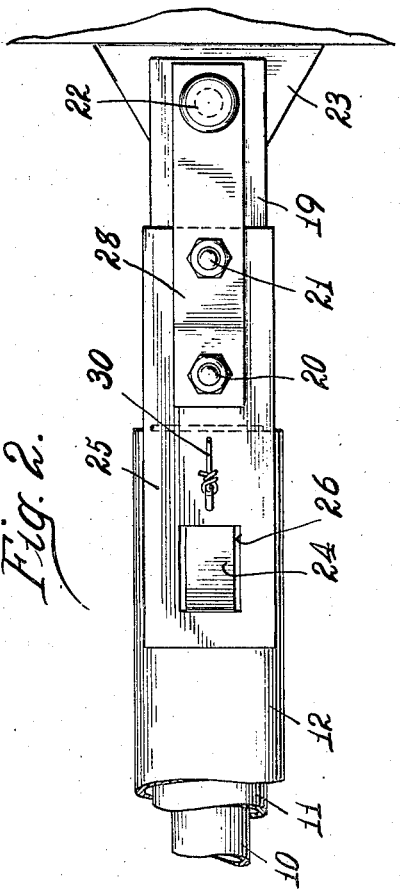
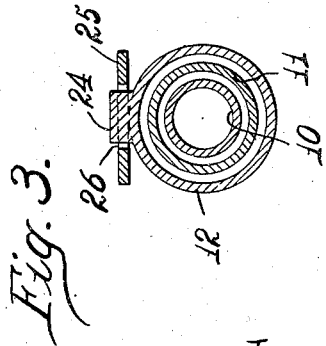
Inventor
Edward Carl Christensen
By: Brayton Richards
Attorney Patented Oct. 22, 1946

2,409,662

UNITED STATES PATENT OFFICE 2,409,662

TOWING POLE

Edward Carl Christensen, Denmark, Wis.

Application August 9, 1944, Serial No. 548,739

1 Claim. (Cl. 280—33.14)

The invention relates to improvements in towing poles and has for its primary object the provision of an extensible towing pole which is of simple construction and highly efficient in operation.

Another object of the invention is the provision of an extensible towing pole provided with improved means for latching the same in retracted condition and releasing the parts for extension.

Other objects will appear hereinafter.

The invention consists of the combinations and arrangements of parts hereinafter described and claimed.

The invention will be best understood by reference to the accompanying drawing forming a part of the specification and in which—

Fig. 1 is a partial longitudinal section of an extensible towing pole embodying the invention;

Fig. 2 a top plan view taken substantially on line 2—2 of Fig. 1; and

Fig. 3 a section taken substantially on line 3—3 of Fig. 1.

The embodiment of the invention illustrated in the drawing comprises three telescoping tubes 10, 11 and 12. The inner tubes 10 and 11 are provided respectively with external stop shoulders 13 and 14 at their inner or rearward ends, and the two outer tubes 11 and 12 are provided respectively with internal stop shoulders 15 and 16 at their outer or forward ends and whereby the outward sliding of the inner tubes will be stopped or limited before said tubes become completely disengaged, as will be readily understood.

The outer tube 12 is provided at its rear end with a bolt 17 by means of which it may be connected, as indicated, with a member 18 on the vehicle to be towed. At its outer or forward end, the inner tube 10 is provided with extension plates 19 secured thereto by means of bolts 20 and 21 and carrying a draft bolt 22 by means of which the same may be secured to the member 23 on the rear end of the towing vehicle, as will be readily understood. A latch lug 24 is secured, as indicated, to the forward end of the outer tube 12 and cooperates with a spring actuated latching plate 25 having an opening 26 adapted and arranged to engage over the lug 24, said latching plate being yieldingly held in latching position by means of a compression spring 27 on the bolt 20 and whereby the tubes 10, 11 and 12 will be automatically locked in retracted positions, as will be readily understood. The supporting plate or bar 28 is secured, as shown, to the bolts 20, 21 and 22. A flexible releasing element 30 in the form of a strong cord or steel cable is attached, as indicated, to the plate 25 and whereby said plate may be withdrawn from engagement with the lug 24 from a distance, as and when desired.

By this arrangement an extensible towing plate is provided which is of simple construction and highly efficient in use. As will be readily understood, when it is desired to release the sections of the pole for extension, this may be done from a distance, as from the seat of the towing vehicle, by drawing upon the cord 30, and the sections may be forced into their retracted condition by backing the towing vehicle. The specific form and arrangement of parts disclosed is a simple and effective one for the purpose.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claim.

A towing pole comprising three telescoping tubes, the inner tubes having external stop shoulders at their inner ends and the outer tubes having internal stop shoulders at their outer ends; extension plates secured to the outer end of the inner tube; a traction bolt secured to said extension plates; a latching lug at the outer end of said outer tube; a spring actuated latching plate carried by the outer end of the inner tube and having an opening arranged to engage said lug automatically upon retraction of said tubes; and a flexible releasing element secured to said latching plate.

EDWARD CARL CHRISTENSEN.